United States Patent [19]

Nelson et al.

[11] Patent Number: 5,551,514
[45] Date of Patent: *Sep. 3, 1996

[54] SAND CONTROL WITHOUT REQUIRING A GRAVEL PACK SCREEN

[75] Inventors: Erik B. Nelson, Broken Arrow, Okla.;
J. Ernest Brown, Madisonville, La.;
Roger J. Card, Tulsa, Okla.

[73] Assignee: Dowell, a division of Schlumberger Technology Corp., Houston, Tex.

[*] Notice: The term of this patent shall not extend beyond the expiration date of Pat. No. 5,439,055.

[21] Appl. No.: 369,625

[22] Filed: Jan. 6, 1995

[51] Int. Cl.$^6$ .................... E21B 33/138; E21B 43/267
[52] U.S. Cl. .................... 166/280; 166/278; 166/281; 166/295
[58] Field of Search ................... 166/278, 280, 166/281, 295, 297

[56] References Cited

U.S. PATENT DOCUMENTS

| | | | |
|---|---|---|---|
| 4,685,519 | 8/1987 | Stowe et al. | 166/280 X |
| 4,979,565 | 12/1990 | Jennings, Jr. | 166/280 X |
| 5,105,886 | 4/1992 | Strubhar et al. | 166/280 |
| 5,330,005 | 7/1994 | Card et al. | 166/280 |
| 5,381,864 | 1/1995 | Nguyen et al. | 166/280 |
| 5,439,055 | 8/1995 | Card et al. | 166/280 |

*Primary Examiner*—George A. Suchfield
*Attorney, Agent, or Firm*—John E. Vick, Jr.

[57] ABSTRACT

A method combining resin consolidation and placement of fibrous material in intimate mixture with particulates provides a means of stabilizing a formation respect to sand production while enhancing well productivity without requiring a gravel pack screen.

19 Claims, No Drawings

SAND CONTROL WITHOUT REQUIRING A GRAVEL PACK SCREEN

This invention relates to the art of recovery of hydrocarbon values from subterranean formations, and more particularly, to a method to control sand production without requiring a sand control screen.

BACKGROUND OF THE INVENTION

In the production of hydrocarbons from a subterranean formation penetrated by a wellbore, it is often necessary to address the problem of the production of fine particulate materials with the desired well fluids. Such fine particulate materials can cause abrasive wear on well components such as pumps, valves and tubular goods resulting in costly replacement. Additionally, these particulates must be separated from the desired well fluids before transport, processing or sale. Further, these particulate materials can accumulate in the wellbore and in the near wellbore area and greatly reduce or completely stop further production of the fluids of value.

Minimizing the production of particulate materials such as formation sand without reducing well productivity has long been the goal of sand control operations. Various technologies have been used including resin consolidation, gravel packing, overbalanced perforating with resin consolidation and the like. Each of these technologies has its own set of problems and limitations. These include problems in assuring placement uniformity and efficiency. Often, these technologies also have the undesired side effect of reducing well productivity.

In the case of gravel packing, placement efficiency is especially crucial. If even a single perforation is not tightly packed with gravel, formation sand will likely be produced in large quantities through the unpacked perforation(s). As a result, expensive separation equipment is required, the erosion of downhole and surface equipment occurs and eventually the well itself is jeopardized through build up of sand in the wellbore. Gravel packs routinely include the use of a gravel-pack screen in the wellbore, with the annulus between the screen and the wellbore itself being tightly packed with gravel. By its very nature, this process requires packing the perforation tunnels with gravel and reducing potential well productivity.

Recently, technology has been introduced that combines the principles of fracturing with those of gravel packing. This technology is generically referred to as frac-and-pack. By creating a small fracture followed by an annulus pack and gravel pack screen, improved well productivity can be obtained relative to that of conventional gravel packing. The need to ensure packing of every perforation still requires use of the expensive gravel pack screen and the production limiting annulus pack.

SUMMARY OF THE INVENTION

The present invention provides a method for treating a subterranean formation which inhibits sand production without requiring a gravel pack screen.

In accordance with the invention, a method of treating a subterranean formation penetrated by a wellbore comprises the steps of treating the formation to consolidate the sands in place, providing a mixture of a fibrous material and a particulate material, pumping a fluid suspension including the mixture of a fibrous material and a particulate material under sufficient pressure to place the mixture of fibrous material and particulate material in a zone extending from the wellbore to more than about 1 foot into the reservoir and depositing the mixture of fibrous material and particulate material in that zone.

Further in accordance of the invention, the step of providing in the above described method comprises providing a mixture of a particulate material having a size in the range of 10 to 100 mesh and a fibrous material selected from a group consisting of natural and synthetic organic fibers, carbon fibers, glass fibers, ceramic fibers, inorganic fibers and metal fibers.

It is therefore an object of this invention to provide a means and method whereby flowback of particulate materials present as a result of unconsolidated formation fines through perforations in a wellbore casing is prevented or inhibited by the presence of fibers in an intimate mixture with particulate materials in combination with resin consolidation of the formation or of proppant materials present in those perforations which may not be packed with the fiber/particulate mixture.

It is yet another object of this invention to provide a means and method to control flowback of particulate materials without requiring the use of a gravel pack screen.

DETAILED DESCRIPTION OF THE PREFERRED EMBODIMENTS

These and other objects of the invention are accomplished through the manner and form of the present invention to be described hereinafter in conjunction with descriptions of exemplary embodiments. These examples should be understood as being illustrative of the invention, only, and not perceived as any limitation on the scope or applicability of the invention described.

In the treatment of subterranean formations, it is common to place particulate materials as a filter medium and/or a proppant in the near wellbore area and in fractures extending outwardly from the wellbore. In a so-called frac-and-pack operation, proppant is carried into fractures or other spaces created when hydraulic pressure is applied to these subterranean rock formations to a point where fractures or other spaces are developed. Proppant suspended in a viscosified fluid is then carried outwardly away from the wellbore within the fractures as they are created and extended with continued pumping. This operation may be performed with a gravel pack screen in place. The annulus between the wellbore and the screen is then packed with gravel. The latter steps are required to maintain the proppant placed in the fracture in position and also to ensure that formation particulates are not returned by the flow of formation fluids to the wellbore where they can be produced through those perforations which may not be densely packed with the proppant.

Flowback of the proppant or formation solid particulates with the produced hydrocarbons is undesirable because either of these solid materials can damage surface and downhole equipment, require expensive surface equipment for separation of the solids from hydrocarbon fluids and eventually result in destabilization of the subterranean wellbore to the extent that the wellbore could collapse and access to the reservoir would be lost. Uncontrolled flow of proppant or formation fines through a single perforation can be sufficient to erode a hole through a gravel pack screen resulting in failure of the gravel pack and requiring expensive workover operations to replace the failed gravel pack with a new one. Therefore, while not foolproof, the gravel pack screen and annulus pack are used as insurance against inefficient packing of each perforation. This insurance against failure is expensive. First, the gravel pack screen can cost tens of thousands of dollars per well. In addition, a decrease in production can occur due to filling of the perforation tunnels with gravel.

In accordance with the present invention, the difficulties and costs associated with the use of a gravel pack screen and annulus gravel pack in a frac-and-pack operation and the related sand control operations are overcome by a process which combines resin consolidation of particulates in the near-wellbore area with placement of a pack comprising an intimate mixture of a fibrous material and a particulate material so that the resin consolidation stabilizes those perforations not filled with the fiber/particulate mixture. While it is a goal of this invention to avoid use of a gravel pack screen and annulus pack, this equipment and procedure may still be used with this invention if desired.

As used in this specification, the term "intimate mixture" will be understood to mean a substantially uniform dispersion of components in a mixture. Similarly, the term "simultaneous mixture" will be understood to mean that the mixture components are blended in the initial steps of the process prior to pumping. Thus, while pumping a fibrous material into a formation followed subsequently by the pumping of a particulate material could possibly result in an "intimate mixture" of these components in accordance with the above definition, such a mixture would not be characterized as a "simultaneous mixture" as defined above.

The first step in the process involves resin consolidation of formation sand in the formation zone which has already been perforated. Alternatively, the resin consolidation can occur simultaneously with perforation. Both processes are well known to those skilled in the art. Any of the various established techniques can be used. For example, a resin solution may be pumped into the formation zone to be treated. This resin treatment may consist of the standard series of fluids containing, in sequence, a pretreatment fluid, a resin solution, an overflush fluid, a curing agent, etc. Components can be combined, e.g., the fluid resin can contain the curing agent. The resin solution can be placed with a gas generator either during or after perforating. The resin may be any of those used in the art such as phenolic, furan, furfuryl alcohol, epoxy resins and the like.

In the resin consolidation operation employed in accordance with the present invention, it is not required that high permeability is restored to the treated zone. Therefore, overflush treatments which are commonly performed to increase the permeability of the resin-consolidated near-wellbore zone become optional. Another way in which resin consolidation can be accomplished is by filling the perforations with resin coated proppants which are pumped into the perforations. The resin coated proppants can be any of those commercially available to the industry or they may be formed in-situ by pumping a mixture of a particulate with a resin containing fluid. The purpose of this treatment is to consolidate the formation to the extent that formation sands are not produced when the well is opened to the production of reservoir fluids. Any convenient technique well known to those skilled in the art which accomplishes resin consolidation of solids in the near-wellbore area may be used. Variations of the above are well known to those experienced in the art and the specific procedures are not critical to the success of the overall invention described herein so long as they meet the purpose of near-wellbore consolidation as identified above.

The next steps of the method comprise providing and pumping a mixture of fibrous material in intimate mixture with a particulate material under sufficient hydrostatic pressure to create a fracture or space into which this mixture can be pumped. The zone in which this mixture is placed will no longer be stabilized by the resin treatment, but is stabilized by the components of the intimate mixture itself. This treatment is expected to break through only a fraction of the total available perforations. Those perforations which are not filled with the proppant/fiber mixture will continue to be stabilized by the resin treatment.

Fiber length, thickness, density and concentration are important variables in the success of preventing proppant flowback. In accordance with the invention, the fiber length ranges upwardly from about 2 millimeters. Fiber diameter is preferably in the range of from about 6 to about 200 microns. There appear to be no upper limits on the length of the fibers employed from a stabilization standpoint. However, practical limitations of handling, mixing, and pumping equipment currently limit the practical use length of the fibers to about 100 millimeters. Fibrillated fibers can also be used and the diameters of the fibrils can be significantly smaller than the aforementioned fiber diameters. The fiber level used in the proppant pack can range from 0.01% to 50% by weight of the proppant sand or gravel. More preferably, the fiber concentration ranges from 0.1% to 5% by weight of proppant.

The material from which the fibers are formed is not a key variable, provided that the fibers do not chemically interact with components of the fracturing or sand control fluids used to place the mixture, but the fibers used should be stable in the subterranean environment for an extended length of time. Thus the fibers can be of glass, ceramic, carbon, natural or synthetic fibers metal fibers or mixtures of any of these fibers. Glass and synthetic polymers are preferred for their low cost and relative stability in most frac-and-pack environments. Carbon fibers are preferred in higher temperature (above about 275° F.) formations, where highly alkaline conditions prevail and/or in situations where subsequent treatment of the formation with solutions containing hydrofluoric acid can be expected. The fibers may be coated with resin and optionally cured in place to provide higher strength.

The density of the fibers used is preferably greater than one gram per cc to avoid separation by flotation in the fluid/proppant slurry. Preferably, the fiber density is in the range of 1 to 4 grams per cc, closely mimicking the density of the proppant materials employed.

Most commonly, straight fibers are used. However, curved, crimped, spiral-shaped, branched and other three dimensional fiber geometries are useful. Likewise, the fibers may be hooked on one or both ends. They may have nodules located along the fiber and/or at the termini. The fibers may be of composite structure, for example a glass fiber coated with a resin to increase fiber-to-fiber adhesion or to increase resistance to corrosive chemicals or other fluid components. In most cases a length to diameter ratio in excess of 300 is preferred. The fiber can have a variety of shapes ranging from simple round or oval cross sectional areas to more complex trilobe, figure eight, star-shaped, rectangular cross sectional areas or the like.

Beyond the advantages of avoiding proppant flowback, additional advantages have been noted in the use of fibrous materials in the well treatment fluid. The presence of fibers in the fluid slows the settling rate of the solid materials in the fluid, thereby permitting the use of lesser amounts of polymeric or other gelling agents in the placement fluid. This feature offers the advantages of lower cost, greater retained permeability, and lower breaker concentrations.

The reduced settling rate also results in more uniform filling of the perforations. This increases the area open to flow and maximizes well productivity.

The fluid loss properties of the fibers are also available when fibers are incorporated into a proppant carrying fracturing fluid. In the areas of high fluid loss typically encountered in frac-and-pack operations, the fibers and sand will concentrate into a mat thereby limiting additional fluid loss in these areas.

Further, studies have shown that return flow of fluids from the reservoir to the wellbore is sufficient to clean the fiber/proppant mixture out of the perforation tunnels, but leave a stable proppant/fiber pack in the formation just inside the metal casing. This behavior is unique to the fiber/proppant intimate mixture and is not seen with sand or proppant alone (where removal of sand from the perforation tunnel is immediately followed by loss of the sand in the perforation or fracture) or with resin coated proppant (which remains in the perforation tunnel if it has become consolidated or behaves like sand if it has not). Packed perforation tunnels have been identified as a major source of reduced well productivity. Use of the sand/fiber mixture in accordance with this invention eliminates packed perforation tunnels and, therefore, maximizes well returns.

Fibers also offer an opportunity to place well treatment chemicals in a dispersed form within the proppant pack. Thus, porous, hollow, absorbent or dissolvable fibers can be filled or formed with various materials such as polymer breakers, scale inhibitors, and/or paraffin and asphaltene inhibitors which can be slowly released within the proppant pack. While the invention has been described in the more limited aspects of preferred embodiments thereof, other embodiments have been suggested and still others will occur to those skilled in the upon a reading and understanding of the foregoing specification. It is intended that all such embodiments be included within the scope of this invention as limited only by the appended claims.

Having thus described our invention, we claim:

1. The method of treating a subterranean formation penetrated by a wellbore comprising the steps of consolidating the formation in a near-wellbore zone with a resinous material, providing a fluid suspension including an intimate mixture of a particulate material and a fibrous material, pumping the fluid suspension including a mixture of the particulate material and the fibrous material through the wellbore and the near-wellbore zone to deposit the mixture of particulate material and fibrous material in the subterranean formation, and perforating the wellbore, wherein the steps of perforating and consolidating are performed simultaneously.

2. The method as set forth in claim 1 wherein the step of consolidating comprises pumping a resin into the near-wellbore zone.

3. The method as set forth in claim 2 further including an overflush treatment subsequent to the step of consolidating to increase permeability of the consolidated, near-wellbore zone.

4. The method as set forth in claim 1 wherein the step of consolidating comprises placing a resin-coated proppant into the near-wellbore zone.

5. The method as set forth in claim 4 wherein the resin-coated proppant is a curable resin-coated proppant and the step of consolidating includes the step of pumping a curing agent subsequent to the placing of the resin-coated proppant.

6. The method as set forth in claim 1 when wherein the step of providing comprises providing an intimate mixture of the particulate material and 0.01 to 50% fiber by volume of the mixture.

7. The method as set forth in claim 6 when wherein the step of providing comprises providing an intimate mixture of a particulate material and 0.01 to 5% fiber by volume of the mixture.

8. The method as set forth in claim 7 when wherein the step of providing comprises providing an intimate mixture of a particulate material and 0.1 to 2% fiber by volume of the mixture.

9. The method as set forth in claim 1 wherein the step of providing comprises providing an intimate mixture of a particulate material and a fiber selected from a group consisting of glass fibers, carbon fibers, natural fibers, synthetic polymer fibers, ceramic fibers, metal fibers and combinations thereof.

10. The method as set forth in claim 1 wherein the step of providing comprises providing an intimate mixture of a particulate material and glass fibers.

11. The method as set forth in claim 1 wherein the step of providing comprises providing an intimate mixture of a particulate material proppant and carbon fibers.

12. The method as set forth in claim 1 wherein the step of providing comprises providing an intimate mixture of a particulate material and synthetic polymer fibers.

13. The method as set forth in claim 1 further including the step of allowing formation fluids to flow back into the wellbore to clean up the near-wellbore zone.

14. The method as set forth in claim 1 further including the step of placing a slotted liner in the wellbore adjacent the formation.

15. The method as set forth in claim 1 wherein the step of providing comprises providing an intimate mixture of a particulate material and fibers, the particulate material having a size of between about 10 and about 100 mesh.

16. The method as set forth in claim 1 wherein the step of providing comprises providing an intimate mixture of a particulate material and fibers, the particulate material having a size of between 10 and 20 mesh.

17. The method as set forth in claim 1 wherein the step of providing comprises providing an intimate mixture of a particulate material and fibers, particulate material having a size of between 20 and 40 mesh.

18. The method as set forth in claim 1 wherein the step of providing comprises providing an intimate mixture of a particulate material and fibers, particulate material having a size of between 40 and 60 mesh.

19. The method as set forth in claim 1 wherein the step of providing comprises providing an intimate mixture of a particulate material and a fiber having a shape selected from a group consisting of linear, curved, circular, spiral, branched, fibrillated and crimped geometry.

\* \* \* \* \*